US007739018B2

(12) United States Patent
Adachi

(10) Patent No.: US 7,739,018 B2
(45) Date of Patent: Jun. 15, 2010

(54) STOPPING POSITION CONTROL APPARATUS AND STOPPING POSITION CONTROL METHOD OF INTERNAL COMBUSTION ENGINE

(75) Inventor: Noriyasu Adachi, Numazu (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 710 days.

(21) Appl. No.: 11/727,722

(22) Filed: Mar. 28, 2007

(65) Prior Publication Data

US 2007/0232444 A1 Oct. 4, 2007

(30) Foreign Application Priority Data

Mar. 29, 2006 (JP) ............................ 2006-091246
Aug. 7, 2006 (JP) ............................ 2006-214447

(51) Int. Cl.
*F02D 45/00* (2006.01)
*G06F 19/00* (2006.01)

(52) U.S. Cl. ......................... 701/58; 701/101; 701/112; 123/179.4

(58) Field of Classification Search .................. 701/58, 701/101, 112, 67; 123/179.3, 179.4, 179.18; 477/74, 173
See application file for complete search history.

(56) References Cited

U.S. PATENT DOCUMENTS

2004/0226530 A1* 11/2004 Kojima .................... 123/179.3
2005/0205038 A1* 9/2005 Lewis et al. ............ 123/179.18
2008/0103683 A1* 5/2008 Tabata et al. ................ 701/112

FOREIGN PATENT DOCUMENTS

| | | |
|---|---|---|
| JP | 58-18535 | 2/1983 |
| JP | 2-305342 | 12/1990 |
| JP | 2004-293444 | 10/2004 |
| JP | 2005-16505 | 1/2005 |
| JP | 2005-330837 | 12/2005 |

* cited by examiner

*Primary Examiner*—Tan Q Nguyen
(74) *Attorney, Agent, or Firm*—Finnegan, Henderson, Farabow, Garrett & Dunner, LLP

(57) ABSTRACT

A stopping position control apparatus of an internal combustion engine includes an engine friction model for calculating the friction around a crankshaft, which calculates friction in the internal combustion engine, and a transmission friction model for calculating the friction around the crankshaft, which calculates friction in a transmission. When a clutch arranged between the internal combustion engine and the transmission is engaged, a crankshaft stopping position is calculated based on the friction calculated by both the engine friction model and the transmission friction model.

11 Claims, 8 Drawing Sheets

STOPPING POSITION CONTROL APPARATUS AND STOPPING POSITION CONTROL METHOD OF INTERNAL COMBUSTION ENGINE

INCORPORATION BY REFERENCE

The disclosures of Japanese Patent Application Nos. 2006-091246 and 2006-214447 filed on Mar. 29, 2006 and Aug. 7, 2006, respectively, each including the specification, drawings and abstract are incorporated herein by reference in their entireties.

BACKGROUND OF THE INVENTION

1. Field of the Invention

The invention relates to a stopping position control apparatus and stopping position control method of an internal combustion engine. More particularly, the invention relates to a stopping position control apparatus of an internal combustion engine to which control for automatically stopping and restarting the internal combustion engine when a vehicle temporarily stops can be applied, as well as a control method thereof.

2. Description of the Related Art

Japanese Patent Application Publication No. JP-A-2004-293444, for example, describes a starting apparatus of an engine which executes control (eco-run control) for automatically stopping and restarting an internal combustion engine when a vehicle temporarily stops. This related technology aims to optimize the piston stopping position (i.e., the crankshaft stopping position) when automatically stopping the engine, by controlling the engine speed at the time the fuel supply is stopped so that the internal combustion engine will restart smoothly the next time.

The effect of friction on the crankshaft may cause the crankshaft stopping position to be off from the target stopping position when automatically stopping the internal combustion engine. The effect of this friction can change depending on whether a clutch arranged between the internal combustion engine and a transmission is engaged when the internal combustion engine is automatically stopped. The related method does not take this into consideration so there remains room for improvement in order to realize an apparatus that accurately estimates the crankshaft stopping position taking the foregoing friction into account.

SUMMARY OF THE INVENTION

This invention thus provides a stopping position control apparatus and stopping position control method of an internal combustion engine which can accurately estimate the crankshaft stopping position in an internal combustion engine to which control for automatically stopping and restarting the internal combustion engine has been applied.

A first aspect of the invention relates to a stopping position control apparatus of an internal combustion engine which includes a transmission; an engine friction model that calculates friction in the internal combustion engine; a transmission friction model that calculates friction in the transmission used in combination with the internal combustion engine; a clutch engagement state detecting device that detects whether a clutch arranged between the internal combustion engine and the transmission is engaged; and a crankshaft stopping position calculating device that calculates a position where a crankshaft of the internal combustion engine is stopped.

When the clutch is engaged, a crankshaft stopping position is calculated based on the friction calculated by both the engine friction model and the transmission friction model.

According to this first aspect, stopping position control which takes into account the difference in the effect of friction depending on the engagement state of the clutch is possible which enables both estimation accuracy and the reliability of the control to be improved.

Also, according to a second aspect of the invention, in the first aspect, the stopping position control apparatus also includes a deviation contributing degree obtaining apparatus that obtains, based on crank angle information of the internal combustion engine, each degree of contribution that the engine friction model and the transmission friction model each contribute to deviation in the crankshaft stopping position due to friction; and a deviation distributing apparatus that distributes, based on the degree of contribution, the deviation in the crank stopping position to the engine friction model and the transmission friction model.

According to the second aspect, the effect from the friction in both the internal combustion engine and the transmission on the crankshaft stopping position can be precisely obtained.

Also, according to a third aspect of the invention, in the second aspect, the stopping position control apparatus also includes a friction correcting apparatus that corrects the engine friction model and/or the transmission friction model based on the distributed deviation in the crankshaft stopping position.

According to the third aspect, the friction can be learned in more minute detail by taking into account the different rates at which oil degrades in the internal combustion engine and in the transmission, for example.

Further, according to a fourth aspect of the invention, in the first aspect, the stopping position control apparatus also includes a correcting information obtaining apparatus that obtains information as to whether the engine friction model and/or the transmission friction model has been corrected while the clutch is engaged. Further, the deviation contributing degree obtaining apparatus includes a contributing degree correcting device that corrects the degree of contribution if the deviation in the crankshaft stopping position is determined to be larger than a predetermined value when the crankshaft stopping position is calculated while the clutch is disengaged after the engine friction model and/or the transmission friction model has been corrected while the clutch is engaged.

According to the fourth aspect, when it is determined that the deviation in the crankshaft stopping position is greater than a predetermined value when the crankshaft stopping position is calculated while the clutch is disengaged after the engine friction model and/or the transmission friction model has been corrected while the clutch is engaged, it can be determined that the calculated value of the engine friction model is appropriate but the degree of contribution that was obtained was not appropriate. In this case, it is possible to precisely obtain the effect of the friction from the internal combustion engine and the transmission on the crankshaft stopping position by correcting the degree of contribution.

Also, according to a fifth aspect of the invention, in the first aspect, the stopping position control apparatus also includes a transmission friction obtaining apparatus, a first friction learning apparatus, and a second friction learning apparatus. The transmission friction obtaining apparatus obtains transmission friction corresponding to the friction in the transmission by separating the transmission friction corresponding to the friction in the transmission from the total friction that is calculated by both the engine friction model and the transmission friction model. The first friction learning apparatus performs learning of the engine friction model and the transmission friction model in combination or performs only learning of the engine friction model, and the second friction learning apparatus performs learning, independently of the first friction learning apparatus, of the transmission friction model based on the transmission friction.

According to the fifth aspect, when updating the engine friction and updating the transmission friction, even if these updates are not completed at the same time, the friction models are updated individually so it is possible to ensure sufficient learning accuracy and learning speeds of the friction models.

A sixth aspect of the invention relates to a stopping position control method of an internal combustion engine, which includes the steps of: calculating friction in the internal combustion engine based on an engine friction model; calculating friction in a transmission used in combination with the internal combustion engine based on a transmission friction model; detecting whether a clutch that is arranged between the internal combustion engine and the transmission is engaged; and calculating a crankshaft stopping position based on the friction calculated by the engine friction model and the transmission friction model, when the clutch is engaged.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

First Example Embodiment

[Structure of the Apparatus According to a First Example Embodiment]

Figure 1:
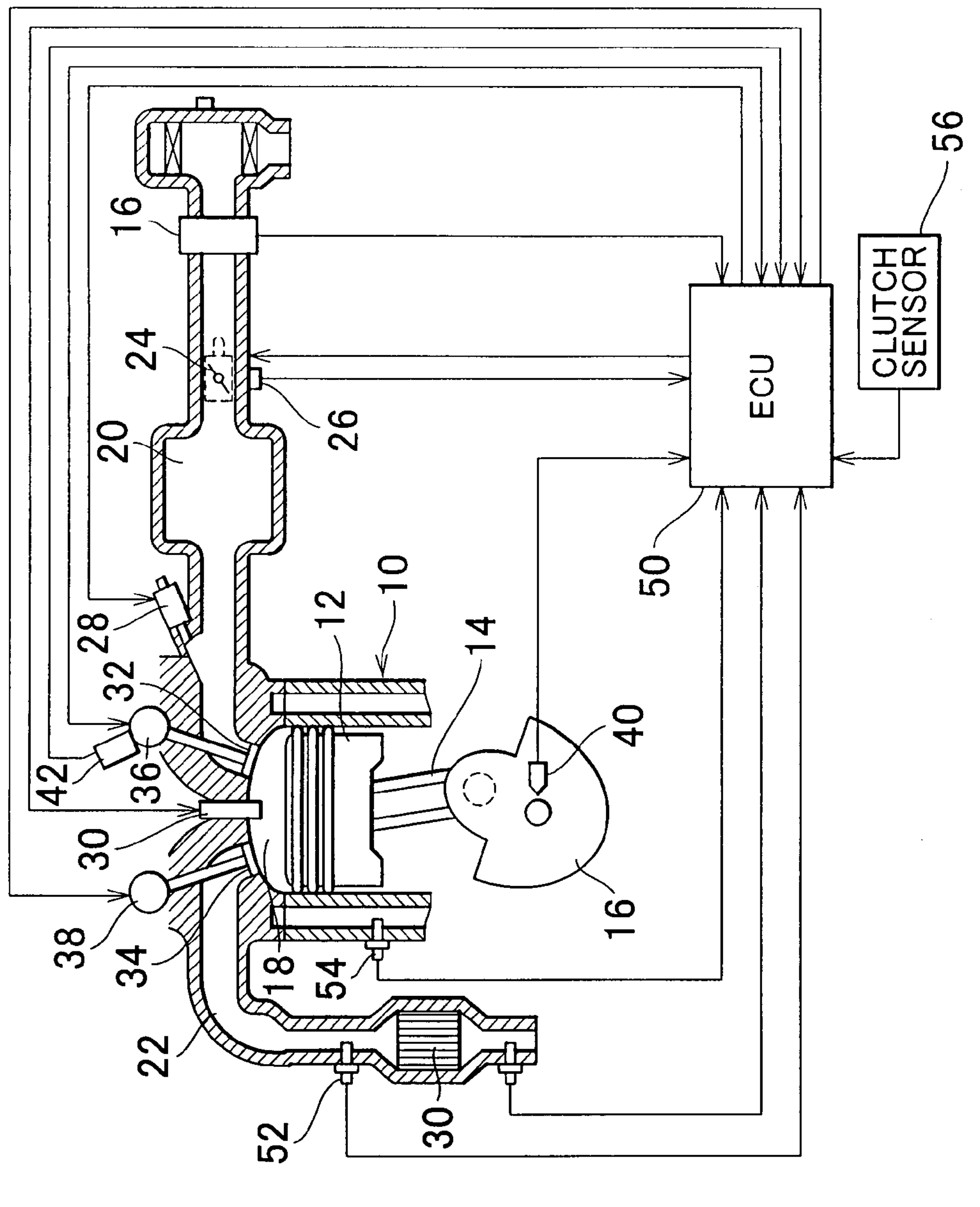
FIG. 1 is a view of the structure of an internal combustion engine to which a stopping position control apparatus of an internal combustion engine according to a first example embodiment of the invention is applied.

FIG. 1 is a view of the structure of an internal combustion engine 10 to which a stopping position control apparatus of an internal combustion engine according to a first example embodiment of the invention is applied. The system of this example embodiment includes the internal combustion engine 10, which in this case, is an inline four cylinder engine. A piston 12 is provided in each cylinder. The piston 12 is connected to a crankshaft 16 via a connecting rod 14. Also, a combustion chamber 18 is formed above the top portion of the piston 12 in each cylinder of the internal combustion engine 10. This combustion chamber 18 is communicated with an intake passage 20 and an exhaust passage 22.

A throttle valve 24 is provided in the intake passage 20. This throttle valve 24 is an electronic throttle valve that can control the throttle opening amount independently from an accelerator depression amount. A throttle position sensor 26 that detects the throttle opening amount TA is disposed near the throttle valve 24. A fuel injection valve 28 for injecting fuel into an intake port of the internal combustion engine 10 is provided downstream of the throttle valve 24. Also, a spark plug 30 is mounted to a cylinder head provided in the internal combustion engine in such a way as to protrude from the top portion of the combustion chamber 18 into the combustion chamber 18 in each cylinder. An intake valve 32 which selectively allows or interrupts communication between the combustion chamber 18 and the intake passage 20 is provided in the intake port. Similarly, an exhaust valve 34 which selectively allows or interrupts communication between the combustion chamber 18 and the exhaust passage 22 is provided in an exhaust port.

The intake valve 32 is driven by an intake variable valve timing (VVT) mechanism 36 and the exhaust valve 34 is driven by an exhaust variable valve timing (VVT) mechanism 38. The intake VVT mechanism 36 opens and closes the intake valve 32 in sync with the rotation of the crankshaft and is also able to change the opening characteristics (e.g., valve opening timing, operating angle, lift amount, etc.) of the intake valve 32. Similarly, the intake VVT mechanism 38 opens and closes the exhaust valve 34 in sync with the rotation of the crankshaft and is also able to change the opening characteristics (e.g., valve opening timing, operating angle, lift amount, etc.) of the exhaust valve 34.

The internal combustion engine 10 is provided with a crank angle sensor 40 near the crankshaft 16. This crank angle sensor 40 is a sensor that reverses Hi and Lo output every time the crankshaft 16 rotates a predetermined angle. The rotational position and rotation speed (i.e., engine speed Ne) of the crankshaft 16 can be detected according to the output from the crank angle sensor 40. The internal combustion engine 10 is also provided with a cam angle sensor 42 near an intake camshaft. This cam angle sensor 42 has the same structure as the crank angle sensor 40. The rotational position (i.e., the advance amount) and the like of the intake camshaft can be detected according to the output from the cam angle sensor 42.

The system shown in FIG. 1 includes an ECU (Electronic Control Unit) 50. In addition to the sensors described above, various other sensors are also connected to the ECU 50, including an air-fuel ratio sensor 52 for detecting an exhaust air-fuel ratio in the exhaust passage 22, a coolant temperature sensor 54 for detecting the temperature of coolant in the internal combustion engine 10, and a clutch sensor 56 for detecting the engagement state of a clutch, not shown, provided between the internal combustion engine 10 and a transmission, also not shown. In addition, the various actuators described above are also connected to the ECU 50. The ECU 50 can control the operating state of the internal combustion engine 10 based on the sensor outputs from the various sensors described above, as well as calculation results using a virtual engine model 60 in the ECU 50.

[Engine Model Schematic]

Figure 2:
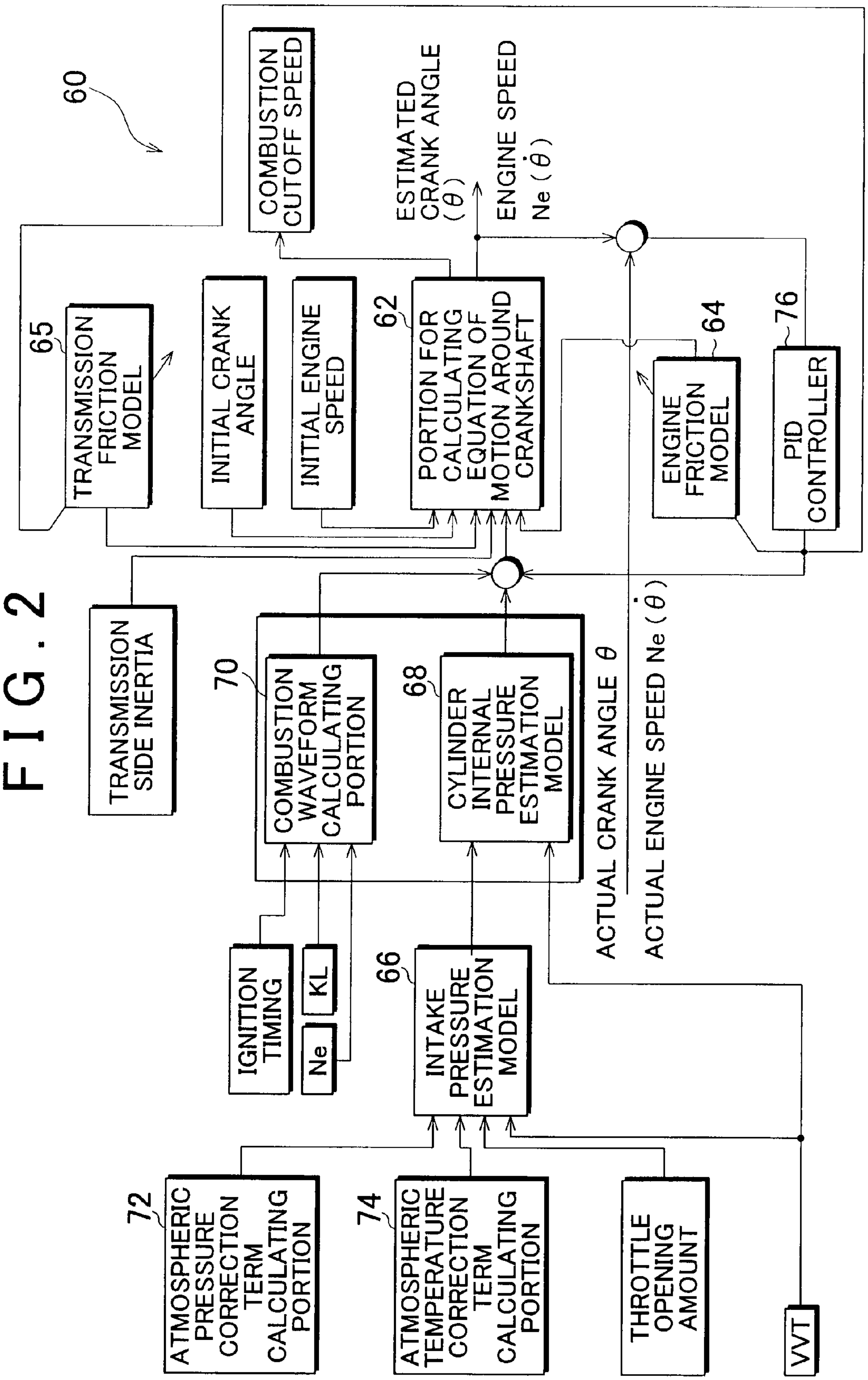
FIG. 2 is a block diagram of the structure of an engine model provided in an ECU shown in FIG. 1.

FIG. 2 is a block diagram of the structure of the engine model 60 in the ECU 50 shown in FIG. 1. As shown in FIG. 2, the engine model 60 includes a portion for calculating an equation of motion around the crankshaft (hereinafter simply referred to as "motion equation calculating portion") 62, an engine friction model 64, a transmission friction model 65, an intake pressure estimation model 66, a cylinder internal pressure estimation model 68, a combustion waveform calculating portion 70, an atmospheric pressure correction term calculating portion 72, and an atmospheric temperature correction term calculating portion 74. Hereinafter, the structures of these portions will be described in detail.

(1) Motion Equation Calculating Portion

The motion equation calculating portion 62 obtains an estimated value for both a crank angle θ and an engine speed Ne (i.e., crank angle rotation speed dθ/dt). The motion equation calculating portion 62 receives a signal indicative of the cylinder internal pressure P of the internal combustion engine 10 from either the cylinder internal pressure estimation model 68 or the combustion waveform calculating portion 70. When the calculation begins, the motion equation calculating portion 62 also receives signals indicative of an initial crank angle $\theta_0$ and an initial engine speed $Ne_0$.

The estimated crank angle θ and the estimated engine speed Ne calculated by the motion equation calculating portion 62 are feedback controlled by a PID controller 76 shown in FIG. 2 to eliminate any difference between the actual crank angle θ and the actual engine speed Ne. Also, the engine friction model 64 reflects the effect of the friction in the internal combustion engine 10 in the calculation results of the motion equation calculating portion 62. Similarly, the transmission friction model 65 reflects the effect of the friction in the transmission (mainly the friction caused by the bearings sliding as they rotate) in the calculation results of the motion equation calculating portion 62.

Figure 3:
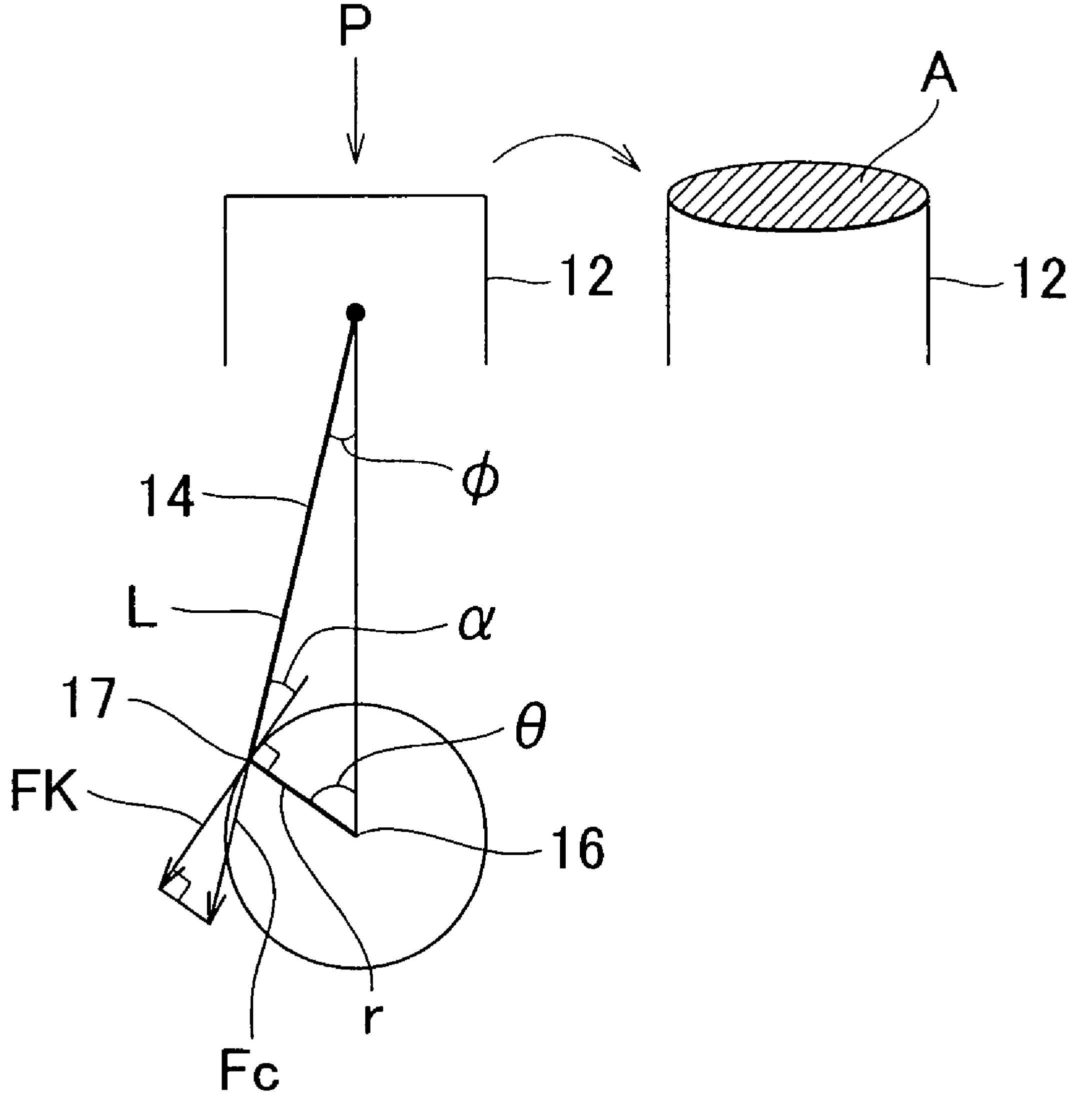
FIG. 3 is a view showing reference characters of each element around the crankshaft.

Next, the specific calculations executed in the motion equation calculation portion 62 will be described. FIG. 3 is a diagram showing the reference characters of each element around the crankshaft. As shown in the drawing, reference character A denotes the surface area of the top portion of the piston 12 that receives the cylinder internal pressure P. Reference character L denotes the length of the connecting rod 14 and reference character r denotes the radius of rotation of the crankshaft. Reference character ϕ (hereinafter referred to as "connecting rod angle ϕ") denotes an angle created between a virtual line (the cylinder axis) which connects the point at which the piston is connected to the connecting rod 14 with the axial center of the crankshaft 16, and the axis of the connecting rod 14. The crank angle θ is the angle formed between the cylinder axis and a crankpin 17.

In the internal combustion engine 10 which has four cylinders, the phase difference of the crank angles between cylinders is 180° CA so the relationship of the crank angles among the cylinders can be defined as shown in Expression (1a) below. Also, the crank angle rotation speed dθ/dt of each cylinder is a temporal differentiation of the crank angle θ of each cylinder and thus can be expressed as shown in Expression (1b) below.

[Expression 1]

$$\theta_1=\theta,\ \theta_2=\theta+\pi,\ \theta_3=\theta+2\pi,\ \theta_4=\theta+3\pi \tag{1a}$$

$$\dot{\theta}=\dot{\theta}_1,\ \dot{\theta}=\dot{\theta}_2,\ \dot{\theta}=\dot{\theta}_3,\ \dot{\theta}=\dot{\theta}_4 \quad \left(\dot{\theta}=\frac{d\theta}{dt}\right) \tag{1b}$$

In Expressions (1a) and (1b) above, reference numerals 1 to 4 appended to the crank angle θ and the crank angle rotation speed dθ/dt correspond to the order of the cylinders in which combustion occurs according to a predetermined firing order of the internal combustion engine 10. Also, in expressions which will be described later, these reference numerals 1 to 4 may be represented by the reference character "i".

Further, in the piston/crank mechanism shown in FIG. 3, the relationship between the crank angle θi and the connecting rod angle ϕi can be written as shown in Expression (2) below.

[Expression 2]

$$\sin(\Phi_i)=\frac{r}{L}\sin(\theta_i),\ \cos(\Phi_i)=\sqrt{1-\left(\frac{r}{L}\right)\sin^2(\theta_i)}, \tag{2}$$

$$\dot{X}_i=r\cdot\sin(\theta_i)\left\{1+\frac{\frac{r}{L}\cos(\theta_i)}{\sqrt{1-\left(\frac{r}{L}\right)^2\sin^2(\theta_i)}}\right\}\dot{\theta}_i$$

$$\left(\dot{X}i=\frac{dXi}{dt}\right),$$

where $\frac{dXi}{dt}$ is the piston speed.

Also, the total kinetic energy T around the crankshaft can be written as shown in FIG. (3) below. When Expression (3) is expanded, all of the parameters of the terms in the expression can be integrated as a coefficient of ½(dθ/dt)$^2$. Here, this kind of integrated coefficient is expressed as the function f(θ) of the crank angle θ.

[Expression 3]

$$\begin{aligned}T&=\frac{1}{2}(I_k+I_{f1}+I_{mi})\dot{\theta}^2+\sum_{i=1}^{4}\frac{1}{2}(m_p+m_c)\dot{X}_i^2+\sum_{i=1}^{4}\frac{1}{2}I_c\dot{\Phi}_i^2\\&=\frac{1}{2}\Bigg[(I_k+I_{f1}+I_{mi})+(m_p+m_c)r^2\cdot\sum_{i=1}^{4}\sin^2(\theta_i)\cdot\left\{1+\frac{\frac{r}{L}\cos(\theta_i)}{\sqrt{1-\left(\frac{r}{L}\right)^2\sin^2(\theta_i)}}\right\}^2+\\&\qquad I_c\left(\frac{r}{L}\right)^2\cdot\sum_{i=1}^{4}\frac{\cos^2(\theta_i)}{1-\left(\frac{r}{L}\right)^2\sin^2(\theta_i)}\Bigg]\cdot\dot{\theta}^2\\&=\frac{1}{2}\cdot f(\theta)\cdot\dot{\theta}^2\end{aligned} \tag{3}$$

In this expression, the first term on the right corresponds to kinetic energy related to rotary movement of the crankshaft 16, the second term on the right corresponds to kinetic energy related to translatory movement of the piston 12 and the connecting rod 14, and the third term on the right corresponds to kinetic motion related to rotary movement of the connecting rod 14. Also, in Expression (3) above, $I_k$ is the inertia movement around the axis of the crankshaft 16, $I_{fl}$ is the inertia movement around the rotational axis of the flywheel, $I_{mi}$ is the inertia movement around the rotational axis of the transmission which used in combination with the internal combustion engine 10, and $I_c$ is the inertia movement related to the connecting rod. Also, $m_p$ is the displacement of the piston 12 and $m_c$ is the displacement of the connecting rod 14. The inertia movement related to the transmission (i.e., the transmission side inertia) is used only when calculating the model when the clutch, which will be described later, is engaged and is zero when calculating the model when the clutch is disengaged.

Next, the Lagrangian L is defined, as shown in Expression (4a) below, as the difference between the total kinetic energy T of the system and the potential energy U. When the input torque applied to the crankshaft 16 is designated TRQ, the relationship between the Lagrangian L, the crank angle θ, and the input torque TRQ can be written as shown in Expression (4b) below using the Lagrangian equation of motion.

[Expression 4]

$$L = T - U \tag{4a}$$

$$\frac{d}{dt}\frac{\partial L}{\partial \dot{\theta}} - \frac{\partial L}{\partial \theta} = TRQ \tag{4b}$$

$$\frac{\partial L}{\partial \dot{\theta}} = f(\theta)\dot{\theta},\ \frac{d}{dt}\frac{\partial L}{\partial \dot{\theta}} = \frac{d}{dt}\frac{\partial f(\theta)}{\partial \theta}\dot{\theta}^2 + f(\theta)\ddot{\theta} \tag{4c}$$

$$\frac{\partial L}{\partial \theta} = \frac{1}{2}\frac{\partial f(\theta)}{\partial \theta}\dot{\theta}^2 \tag{4d}$$

$$\therefore \frac{d}{dt}\frac{\partial L}{\partial \dot{\theta}} - \frac{\partial L}{\partial \theta} = TRQ \Leftrightarrow f(\theta)\ddot{\theta} + \frac{1}{2}\frac{\partial f(\theta)}{\partial \theta}\dot{\theta}^2 = TRQ \tag{4e}$$

Here, in Expression (4a), the effect of the potential energy U is less than the effect of the kinetic energy T and can be ignored. Accordingly, the first term on the left side of Expression (4b) can be written, as shown in Expression (4c), as a function of the crank angle θ by temporally differentiating a value obtained by partially differentiating Expression (3) above by the crank angle rotation speed (dθ/dt). Also, the second term on the left side in Expression (4b) can be written, as shown in Expression (4d), as a function of the crank angle θ by partially differentiating Expression (3) above by the crank angle θ.

Accordingly, Expression (4b) above can be written as shown in Expression (4e). As a result, the relationship between the crank angle θ and the input torque TRQ can be obtained. Also, here the input torque TRQ is defined by three parameters, as shown in Expression (5) below

[Expression 5]

$$TRQ = TRQ_e - TRQ_L - TRQ_f \tag{5}$$

In Expression (5), $TRQ_e$ is the engine generated torque, or more specifically, the torque applied to the crankshaft 16 from the piston 12 on which gas pressure (i.e., the cylinder internal pressure P) is exerted. $TRQ_L$ is the load torque and is stored in the ECU 50 as a known value that differs depending on the characteristics of the vehicle in which the internal combustion engine 10 is mounted. $TRQ_f$ is the friction torque, i.e., torque corresponding to friction loss from the piston 12, the crankshaft 16, and the sliding portions in the transmission. This friction torque $TRQ_f$ is a value that is obtained from the engine friction model 64 and the transmission friction model 65. More specifically, when the clutch is engaged, the friction torque $TRQ_f$ is calculated using both the engine friction model 64 and the transmission friction model 65. On the other hand, when the clutch is disengaged, the friction torque $TRQ_f$ is calculated using only the engine friction model 64.

Next, the engine generated torque $TRQ_e$ can be calculated according to Expressions (6a) to (6c) below. That is, first the force $F_c$ applied to the connecting rod 14 based on the cylinder internal pressure P can be written, as shown in Expression (6a), as a component in the axial direction of the connecting rod 14 of the force PA acting on the top portion of the piston 12. Then, as shown in FIG. 3, the angle α created between the axis of the connecting rod 14 and the tangent of the trajectory of the crankpin 17 is {π/2−(ϕ+θ)} so the force $F_k$ acting tangientially to the trajectory of the crankpin 17 based on the cylinder internal pressure P can be written as Expression (6b) using the force $F_c$ acting on the connecting rod 14. Therefore, the engine generated torque $TRQ_e$ is the product of the force $F_k$ acting tangientially to the trajectory of the crankpin 17 and the rotation radius r of the crankshaft and thus can be written as shown in Expression (6c) using Expression (6a) and Expression (6b).

[Expression 6]

$$F_c = P \cdot A\cos(\Phi) \tag{6a}$$

$$F_k = F_c \sin(\Phi + \theta) \tag{6b}$$

$$\begin{aligned} \therefore TRQ_e &= F_k \cdot r = P \cdot A \cdot r \cdot \cos(\Phi)\sin(\Phi + \theta) \\ &= P \cdot A \cdot r \cdot \left[\left\{1 - \left(\frac{r}{L}\right)^2 \sin^2(\theta)\right\} + \frac{r}{L}\cos(\theta)\right]\sin(\theta) \end{aligned} \tag{6c}$$

According to the structure of the motion equation calculating portion 62 described above, the input torque TRQ can be obtained according to Expression (6c) and Expression (5) by obtaining the cylinder internal pressure P from the cylinder internal pressure estimation model 68 or the combustion waveform calculating portion 70. Also, the crank angle θ and the crank angle rotation speed dθ/dt can be obtained by solving Expression (4e).

(2) Engine Friction Model

Figure 4A:
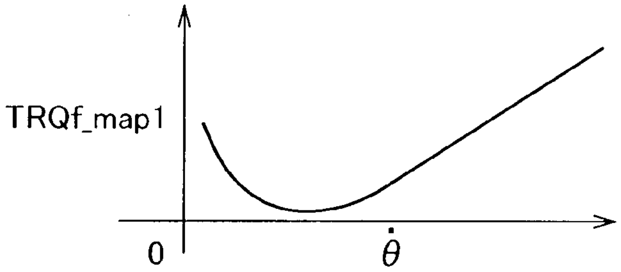
FIGS. 4A and 4B are graphs showing an example of engine friction maps for obtaining engine friction torque $TRQ_{f\_EN}$, which are provided in the engine friction model shown in FIG. 2.
Figure 4B:
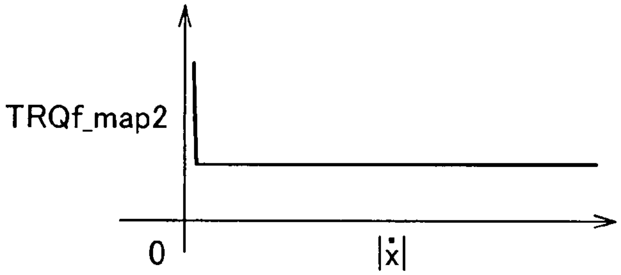

FIGS. 4A and 4B show an example of engine friction maps for obtaining the engine friction torque $TRQ_{f\_EN}$ which are provided in the engine friction model 64 shown in FIG. 2. More specifically, FIG. 4A is graph conceptually showing the relationship between the crank angle rotation speed (dθ/dt) and a first engine friction torque $TRQ_{f\_map1}$ related to rotational sliding around the crankshaft 16. FIG. 4B is a graph conceptually showing the relationship between piston speed (dXi/dt) and a second engine friction torque $TRQ_{f\_map2}$ related to translational movement of the piston 12.

In the system in this example embodiment, the engine friction torque $TRQ_{f\_EN}$ may be considered divided into the first engine friction torque $TRQ_{f\_map1}$ and the second engine friction torque $TRQ_{f\_map2}$, as described above, in the steps of the routine shown in FIG. 7, which will be described later, in order to improve the model calculating accuracy of the engine model 60.

As shown in FIG. 4A, the first engine friction torque $TRQ_{f\_map1}$, related to rotational sliding around the crankshaft 16 basically relies on the engine speed (dθ/dt). More specifically, as shown in FIG. 4A, in the region where the engine speed (dθ/dt) is close to zero, the torque $TRQ_{f\_map1}$ increases from the effect of the maximum static friction coefficient. When the engine speed (dθ/dt) starts to increase, the effect from the maximum static friction coefficient decreases so the torque $TRQ_{f\_map1}$ reverses and starts to decrease, but then increases again as the engine speed (dθ/dt) increases.

Also, as shown in FIG. 4B, the second engine friction torque $TRQ_{f\_map2}$ related to the translational movement of the piston 12 is friction between the piston 12 and the cylinder wall surface. This second engine friction torque $TRQ_{f\_map2}$ relies only on the friction coefficient and the contact pressure between the two, and does not rely on the piston speed (dXi/dt). Also, in the region where the piston speed (dXi/dt) is close to zero in FIG. 4B, the reason that the second engine friction torque $TRQ_{f\_map2}$ indicates a large value is because the effect from the maximum static friction coefficient increases in this region.

The engine friction torque $TRQ_{f\_EN}$ tends to increase the lower the engine coolant temperature. Therefore, although not shown in FIGS. 4A and 4B, the engine friction torque $TRQ_{f\_EN}$ is determined taking not only the relationship with the engine speed Ne (and the piston speed (dXi/dt)), but also the engine coolant temperature, into account. Further, because of the decrease in the calculated load on the ECU 50 in this case, friction maps such as those described above are provided as the engine friction model 64. The structure of the engine friction model is not limited to this, however. For example, a relation expression such as that shown in Expression (7) below may also be used. In Expression (7), the engine friction torque $TRQ_{f\_EN}$ is made to become a function with the engine speed Ne and the kinetic viscosity u of the lubrication oil of the internal combustion engine 10 as parameters.

[Expression 7]

$$TRQ_{f\_EN}=C_1 \cdot Ne^2+C_2 \cdot \nu+C_3 \quad (7),$$

wherein C1, C2, and C3 are coefficients that were verified to be appropriate through testing or the like.

(3) Transmission Friction Model

Figure 5:
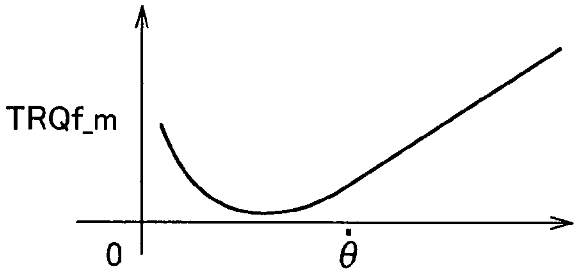
FIG. 5 is a graph showing an example of a transmission friction map for obtaining transmission friction torque $TRQ_{f\_m}$, which is provided in the transmission friction model shown in FIG. 2.

FIG. 5 is an example of a transmission friction map for obtaining transmission friction torque $TRQ_{f\_m}$, which is provided in the transmission friction model 65 shown in FIG. 2. The transmission friction torque $TRQ_{f\_m}$ calculated by the transmission friction model 65 is the friction torque when the transmission is in neutral while the vehicle is stopped and the clutch is engaged, i.e., while the gears of the transmission are rotating without power from the internal combustion engine 10 being transmitted to the tires. Therefore, the transmission friction torque $TRQ_{f\_m}$ is determined to be a value corresponding to the friction in the transmission (mainly friction from the bearings sliding as they rotate). As a result, as shown in FIG. 5, the transmission friction torque $TRQ_{f\_m}$ relies on the engine speed (dθ/dt), just like the first engine friction torque $TRQ_{f\_map1}$.

(4) Intake Pressure Estimation Model

The intake pressure estimation model 66 includes an intake pressure map, not shown, for estimating the intake pressure. In this intake air map, the intake air pressure is determined by the relationship between the throttle opening amount TA, the engine speed Ne, and the valve timing VVT of the intake and exhaust valves. Configuring the intake pressure estimation model this way enables the intake pressure to be obtained while minimizing the calculation load on the ECU 50. In particular, the intake pressure estimation model may be configured without using this kind of intake pressure map, but instead using a throttle model that estimates the air flowrate through the throttle valve 24 and a valve model that estimates the air flowrate through the circumjacent intake valve 32 (i.e., the flowrate of air drawn into the cylinder) when calculating the intake pressure.

(5) Cylinder Internal Pressure Estimation Model

The cylinder internal pressure estimation model 68 is a model used to calculate the cylinder internal pressure P when combustion is not taking place. With this cylinder internal pressure estimation model 68, the cylinder internal pressure P during each stroke of the internal combustion engine 10 is calculated using Expressions (8a) to (8d) below. That is, first, as shown in Expression (8a), the cylinder internal pressure P during the intake stroke is obtained from a map value $P_{map}$ of the cylinder internal pressure, which is obtained from the intake pressure map in the intake pressure estimation model 66 described above.

[Expression 8]

$$\text{Intake stroke } P = P_{map}(Ne, VVT, TA) \quad (8a)$$

$$\text{Compression stroke } P = \left(\frac{V_{bdc}}{V}\right)^{\kappa} \cdot P_{map} \quad (8b)$$

$$\text{Expansion stroke } P = \left(\frac{V_{tdc}}{V}\right)^{\kappa} \cdot P_C \quad (8c)$$

$$\text{Exhaust stroke } P = P_{ex} \approx P_{air} \quad (8d)$$

Next, the cylinder internal pressure P during the compression stroke can be written as shown in Expression (8b) based on an expression of the reversible adiabatic change in the gas. However, in Expression (8b), $V_{bdc}$ is the stroke volume V when the piston 12 is at BDC (bottom dead center) of the intake stroke, and K is the specific heat ratio.

Also, the cylinder internal pressure P during the expansion stroke can also be written as shown in FIG. (8*c*), similar to the case with the compression stroke. However, in Expression (8c), $V_{tdc}$ is the stroke volume V when the piston 12 is at TDC (top dead center), and $P_c$ is the cylinder internal pressure at the end of the compression stroke.

Also, the cylinder internal pressure P during the exhaust stroke is the pressure $P_{ex}$ in the exhaust passage 22, as shown in Expression (8d). This pressure $P_{ex}$ can be regarded as being substantially equal to the atmospheric pressure $P_{air}$. Therefore in this case, the atmospheric pressure $P_{air}$ is used for the cylinder internal pressure P during the exhaust stroke.

(6) Combustion Waveform Calculating Portion

The combustion waveform calculating portion 70 is a model used to calculate the cylinder internal pressure (combustion pressure) P during the period during which combustion is performed from partway through the compression stroke to partway through the expansion stroke. In this combustion waveform calculating portion 70, an estimated value of the combustion pressure P is calculated using Expression (9a), which is a relational expression that uses a Weibe function, and Expression (10) which will be described later.

[Expression 9]

$$\frac{dQ}{d\theta} = a\cdot\frac{k\cdot Q}{\theta_p}\cdot(m+1)\cdot\left(\frac{\theta-\theta_b}{\theta_p}\right)^m\cdot\exp\left\{-a\cdot\left(\frac{\theta-\theta_b}{\theta_p}\right)^{m+1}\right\} \quad (9a)$$

Here, $$\frac{dg(\theta)}{d\theta} \equiv \frac{d}{d\theta}\left(\exp\left\{-a\cdot\left(\frac{\theta-\theta_b}{\theta_p}\right)^{m+1}\right\}\right) = -a\cdot(m+1)\cdot\left(\frac{\theta-\theta_b}{\theta_p}\right)^m\cdot\exp\left\{-a\cdot\left(\frac{\theta-\theta_b}{\theta_p}\right)^{m+1}\right\} \quad (9b)$$

Therefore, Expression (9*a*) can be rewitten as $$\frac{dQ}{d\theta} = -\frac{k\cdot Q}{\theta_p}\cdot\frac{d}{d\theta}\left(\exp\left\{-a\cdot\left(\frac{\theta-\theta_b}{\theta_p}\right)^{m+1}\right\}\right) = -\frac{k\cdot Q}{\theta_p}\cdot\frac{dg(\theta)}{d\theta} \quad (9c)$$

$$\Leftrightarrow \frac{dQ}{Q}\cdot\frac{1}{d\theta} = -\frac{k}{\theta_p}\cdot\frac{dg(\theta)}{d\theta}$$

When both sides of Expression (9*c*) are integrated by $\theta$, we get $$\int\frac{1}{Q}\cdot\frac{dQ}{d\theta}d\theta = -\frac{k}{\theta_p}\cdot\int\frac{dg(\theta)}{d\theta}d\theta \quad (9d)$$

$$\Leftrightarrow \int\frac{1}{Q}d\theta = -\frac{k}{\theta_p}\cdot\int dg(\theta)$$

$$\Leftrightarrow \log Q + C_2 = -\frac{k}{\theta_p}\cdot g(\theta) + C_1$$

$$\log Q = -\frac{k}{\theta_p}\cdot g(\theta) + C$$

(where $C=C_1-C_2$ : $C$, $C_1$, and $C_2$ are each integration constants)

$$Q = \exp\left(C-\frac{k}{\theta_p}\cdot g(\theta)\right) = \exp\left[C-\frac{k}{\theta_p}\cdot\exp\left\{-a\cdot\left(\frac{\theta-\theta_b}{\theta_p}\right)^{m+1}\right\}\right]$$

More specifically, in the combustion waveform calculating portion 70, the rate of heat generation dQ/dθ corresponding to the current crank angle θ is first calculated using Expression (9a). In Expression (9a), m is the profile coefficient, k is the combustion efficiency, $\theta_b$ is the ignition retard period, and a is the combustion rate (here a fixed value of 6.9). Values which have been verified to be appropriate beforehand are used for these parameters. Also, Q is the calorific value.

The calorific value Q must be calculated to calculate the rate of heat generation dQ/dθ using Expression (9a) above. The calorific value Q can be calculated by solving Expression (9a) which is a differential equation. Therefore in Expression (9b), we first substitute the portion corresponding to the Weibe function in Expression (9a) with g(θ). Once this is done, Expression (9a) can be rewritten as shown in Expression (9c). After integrating both sides of Expression (9c) by the crank angle θ the expression is expanded such that the calorific value Q can be written as shown in Expression (9d). Next, the rate of heat generation dQ/dθ can be calculated by substituting the calorific value Q that was calculated according to Expression (9d) back into Expression (9a) again.

The rate of heat generation dQ/dθ and the cylinder internal pressure (i.e., combustion pressure) P can be written as shown in Expression (10) using a relational expression based on the conservation law of energy. Accordingly, the combustion pressure P can be calculated by substituting in the rate of heat generation dQ/dθ calculated according to Expression (9a) and solving Expression (10).

[Expression 10]

$$\frac{dQ}{d\theta} = \frac{1}{\kappa-1}\cdot\left(V\cdot\frac{dP}{d\theta}+\kappa\cdot P\cdot\frac{dV}{d\theta}\right) \quad (10)$$

According to the cylinder internal pressure estimation model 68 and the combustion waveform calculating portion 70 described above, the history of the cylinder internal pressure P of the internal combustion engine 10 can be obtained irrespective of whether combustion is taking place by calculating the cylinder internal pressure P when combustion is not taking place using the cylinder internal pressure estimation model 68, and calculating the cylinder internal pressure P while combustion is taking place using the combustion waveform calculating portion 70.

Figure 6A:
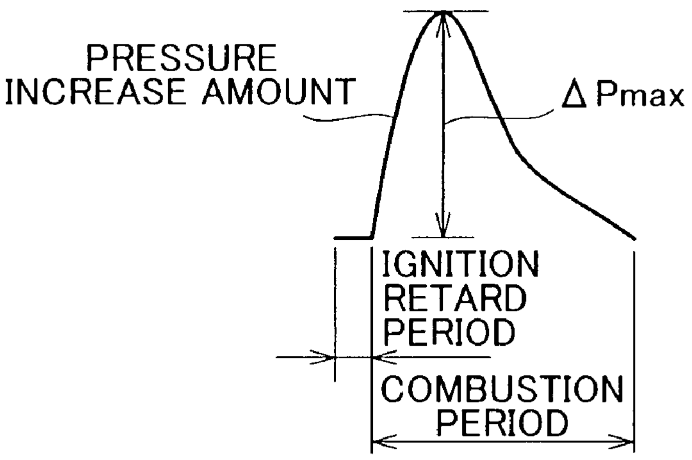
FIGS. 6A and 6B are views illustrating a method according to a modified example for obtaining the history of an cylinder internal pressure P.
Figure 6B:
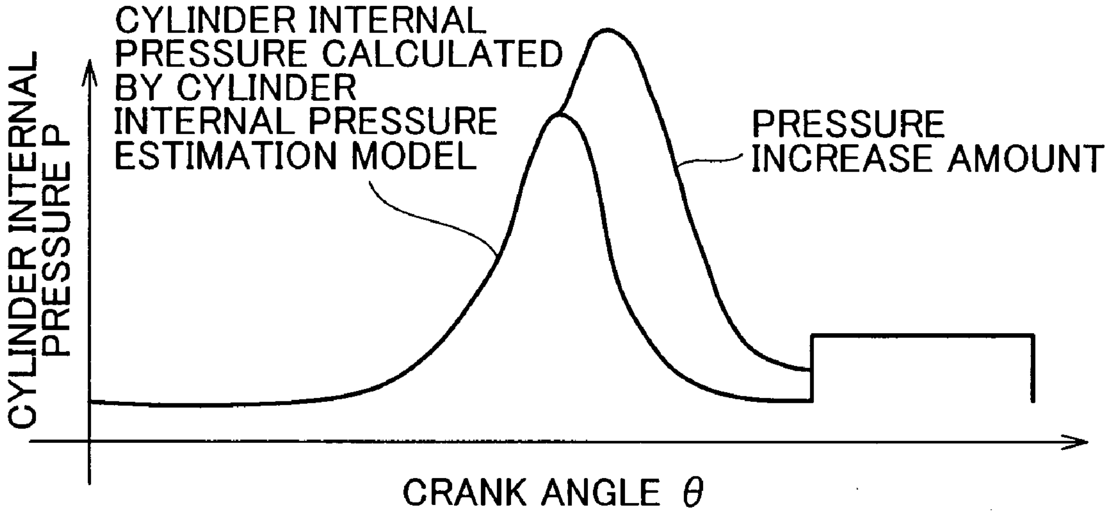

The method for obtaining the history of the cylinder internal pressure P of the internal combustion engine 10 is not limited to the method described above. For example, a method such as that illustrated in FIGS. 6A and 6B, described below, may be used. FIGS. 6A and 6B are graphs showing one such modified example. According to this method, instead of calculating the combustion pressure at each predetermined crank angle θ using Expressions (9a) and (10), only the combustion pattern such as that shown in FIG. 6A, i.e., only the amount of change in the waveform of the cylinder internal pressure P which changes with combustion, (that is, only the amount of pressure increase from combustion) is calculated in advance using Expressions (9a) and (10).

More specifically, a map is stored which establishes the relationship between each of three parameters that determine this kind of combustion pattern, the three parameters being the ignition retard period, combustion period, and $\Delta P_{max}$ (which is the difference between the maximum pressure $P_{max}$ during combustion and the maximum pressure $P_{max0}$ when combustion is not taking place), and the engine speed Ne, the air charging efficiency KL, the valve timing VVT of the intake and exhaust valves, and the ignition timing. Then, in order to calculate the waveform corresponding to the amount of pressure increase from combustion as an approximate waveform that has been combined with a simple function such as a quadratic function, each coefficient of the approximate waveform is mapped out with respect to the engine speed Ne. Then as shown in FIG. 6B, the combustion pressure (i.e., the cylinder internal pressure P) is obtained by matching the waveform of the amount of pressure increase from combustion that was obtained referring to that map with the value of the cylinder internal pressure P calculated by the cylinder internal pressure estimation model 68.

(6) Atmospheric Pressure Correction Term Calculating Portion

The atmospheric pressure correction term calculating portion 72 includes a model for calculating an amount of air charged (i.e., drawn) in the cylinder (hereinafter simply referred to as "charged air amount") $M_c$. This model, which we will refer to as the "air model", calculates the charged air amount $M_c$ according to Expression (11) below.

[Expression 11]

$$Mc=aPm-b \quad (11)$$

In Expression (11), a and b are coefficients that are appropriate for the driving conditions (such as the engine speed Ne and the valve timing VVT and the like). $P_m$ is the intake pressure. A value calculated by the intake pressure estimation model 66 described above, for example, can be used for the $P_m$.

Also, the atmospheric pressure correction term calculating portion 72 includes a model for estimating a fuel quantity $f_c$ drawn into the cylinder. This model will be referred to as the "fuel model". Taking into account the behavior of the fuel after it is injected from the fuel injection valve 28, i.e., taking into account a phenomenon in which some of the injected fuel adheres to the inside wall and the like of the intake port and then vaporizes, when the amount of fuel that adheres to the wall surface when fuel starts to be injected during cycle k is designated $f_w(k)$ and the amount of fuel that is actually injected during cycle k is designated $f_i(k)$, the amount of adhered fuel $f_w(k+1)$ after cycle k ends and the fuel quantity $f_c$ drawn into the cylinder during cycle k can be written as shown in Expressions (12a) and (12b), respectively, below.

[Expression 12]

$$f_w(k+1)=P(k)\cdot f_w(k)+R(k)\cdot f_i(k) \quad (12a)$$

$$f_c(k)=(1-P(k))\cdot f_w(k)(1-R(k))\cdot f_i(k) \quad (12b)$$

In Expressions (12a) and (12b), P is the adherence rate, or more specifically, the ratio of the amount of fuel that adheres to the inside wall and the like of the intake port with respect to the amount of injected fuel $f_i$. R is the residual rate, or more specifically, the ratio of the amount of adhered fuel $f_w$ that remains adhered to the wall surface and the like after the intake stroke with respect to the amount of injected fuel $f_i$. According to Expressions (12a) and (12b), the fuel quantity $f_c$ can be calculated for each cycle with the adhesion rate P and the residual rate R as parameters.

Therefore, an estimated value of the air-fuel ratio A/F can be calculated using the calculation results of the air model and the fuel model. The atmospheric pressure correction term calculating portion 72 next calculates a steady-state deviation between this estimated air-fuel ratio A/F and an actually measured value of the air-fuel ratio A/F that is detected at a timing that takes into account the delay between the time the injected fuel was combusted and the time that combusted fuel reaches the air-fuel ratio sensor 52. Because this steady-state deviation is the error in the charged air amount $M_c$, when the steady-state deviation is large, the atmospheric pressure is determined to be off so an atmospheric pressure correction coefficient $k_{airp}$ is calculated. More specifically, the intake pressure $P_m$ is calculated back from the air model and the atmospheric pressure correction coefficient $k_{airp}$ is calculated as a correction factor for the reference atmospheric pressure $P_{a0}$ based on that intake pressure $P_m$. This atmospheric pressure correction coefficient $k_{airp}$ is used to correct the intake pressure $P_{map}$ and the exhaust pressure (i.e., atmospheric pressure $P_{air}$) in the intake pressure estimation model and the cylinder internal pressure estimation model 68 described above.

(7) Atmospheric Temperature Correction Term Calculating Portion

The atmospheric temperature correction term calculating portion 74 calculates the cylinder internal pressure $P_{th}$ by assigning the actual measured values of the volumetric displacement V during the exhaust stroke, the residual gas mass (which is calculated based on the clearance volume $V_c$ at TDC of the exhaust stroke) m, the gas constant R of the residual gas (i.e., already combusted gas), and the atmospheric temperature $T_{air}$ to the ideal gas equation. Then the deviation between the cylinder internal pressure $P_{th}$ and the cylinder internal pressure P calculated by the cylinder internal pressure estimation model 68 is calculated. If that deviation is large, a correction coefficient is calculated based on that deviation. This correction coefficient is used to correct the intake pressure $P_{map}$ in the intake pressure estimation model 66.

[Friction Learning in the First Example Embodiment]

In a vehicle provided with an internal combustion engine, control (eco-run control) may be performed which automatically stops and restarts the internal combustion engine when the vehicle stops temporarily. In a hybrid vehicle in which the vehicle is driven by an internal combustion engine and a motor as well, control which automatically stops and restarts the internal combustion engine (in this specification, this control will also be referred to as "eco-run control" in a broad sense) may be performed while the vehicle system is operating (including while the vehicle is running).

In this eco-run control, it is desirable to precisely control the stopping position of the crankshaft 16 (i.e., the stopping position of the piston 12) when the internal combustion engine automatically stops to a target stopping position so that the internal combustion engine will be able to restart smoothly. Thus, in the system of this example embodiment, the engine model 60 described above is used as a stopping position estimation model for estimating the stopping position of the crankshaft 16 during eco-run control. According to the foregoing engine model 60, the stopping position of the crankshaft 16 when the internal combustion engine 10 is automatically stopped can be obtained by obtaining an estimated value of the crank angle θ when the crank angle rotation speed dθ/dt is zero. In this specification, the stopping position of the crankshaft 16 may also simply be referred to as the "crankshaft stopping position".

When automatically stopping the internal combustion engine 10, friction on the crankshaft 16 may cause the crankshaft stopping position to be off from the target stopping position. The eco-run control described above is executed regardless of whether the clutch is engaged when the vehicle is stopped. Strictly speaking, the friction and the inertia around the crankshaft 16 change depending on whether or not the clutch is engaged at this time. Also, the rate at which oil degrades and the like is different in the internal combustion engine 10 than it is in the transmission. Therefore, unless the differences in the friction and inertia which depend on whether the clutch is engaged is taken into account, highly accurate adaptive learning control of the crankshaft stopping position is not possible.

Therefore, in the system of this example embodiment, as described above, the engine friction model 64 and the transmission friction model 65 are provided separately. When the clutch is engaged when the vehicle is stopped, friction learning is performed using the engine friction model 64 and the transmission friction model 65. On the other hand, when the clutch is disengaged when the vehicle is stopped, friction learning is performed using only the engine friction model 64.

Figure 7:
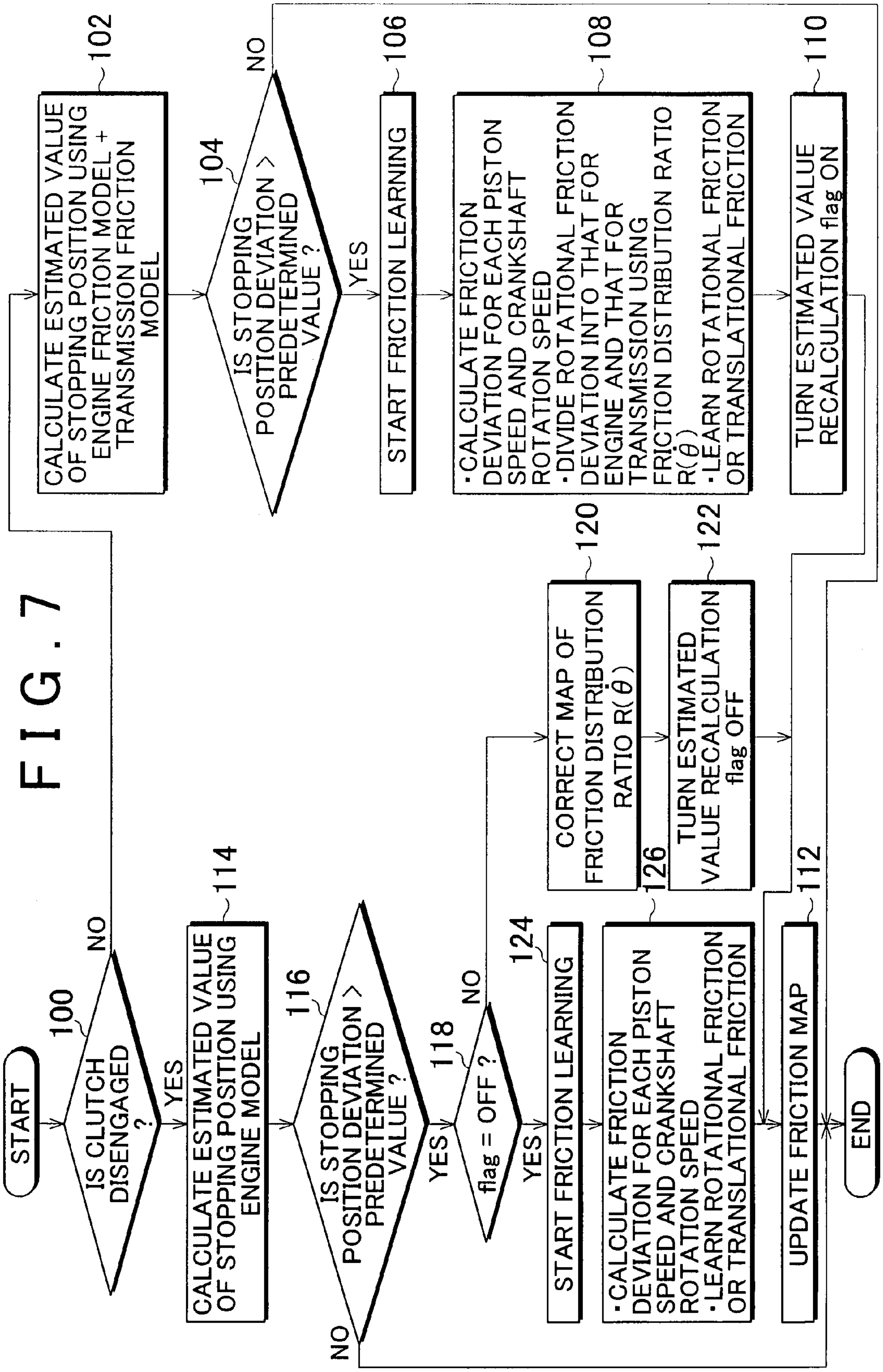
FIG. 7 is a flowchart of a routine executed in the first example embodiment.

FIG. 7 is a flowchart of a routine executed by the ECU 50 in the first example embodiment in order to realize the foregoing function. The routine shown in FIG. 7 is executed when a condition, in which the internal combustion engine 10 is automatically stopped by the actual engine speed Ne reaching a predetermined combustion cutoff speed, is satisfied when eco-run control is executed in the vehicle.

(Process Related to Step 100)

In the routine shown in FIG. 7, it is first determined based on a signal generated by the clutch sensor 56 whether the clutch is disengaged (step 100).

1. Process of Clutch Engagement (Process Related to Step 102)

If it is determined in step 100 that the clutch is engaged, then the estimated value of the crankshaft stopping position is calculated by the engine model 60 using both the engine friction model 64 and the transmission friction model 65 as friction models (step 102).

More specifically, in step 102, the average value of the combustion pressure P obtained while the vehicle was idling, the intake pressure $P_{map}$, the crank angle $\theta_0$, and the engine speed (combustion cutoff speed) Ne (=crank angle rotation speed $d\theta_0/dt$) are input as initial values and an estimated value for each of the crank angle θ and the crank angle rotation speed dθ/dt are calculated sequentially using the motion equation calculating portion 62. The details of that calculation method will now be described using Expressions (13) and (14) below. In this specification, the solving of this engine model 60 in the direction of the arrows in FIG. 2 using this method will be referred to as the "forward model calculation".

First, in the equation of motion around the crankshaft written in Expression (4e) above, $(\partial f(\theta)/\partial\theta) \equiv h(\theta)$ and Expression (5) is substituted for the input torque TRQ in Expression (4e). Then Expression (4e) is discretized which yields Expression (13) below.

[Expression 13]

$$\{\theta(k+2)-\theta(k+1)\}-\{\theta(k+1)-\theta(k)\}=\left[TRQ_e(\theta(k))-TRQ_{fr}(\theta(k+1)-\theta(k))-\frac{1}{2}h(\theta(k))\cdot(\theta(k+1)-\theta(k))^2\right]\Big/ f(\theta(k)) \tag{13}$$

The process of step 102 is a model calculation for when the clutch engaged. Thus as described above, the inertia moment $I_{mi}$ related to the transmission is matched up with the right side of Expression (3) which is a formula for computation of the total kinetic energy T around the crankshaft. Also, in the process of step 102, the friction torque $TRQ_f$ in Expression (5) is calculated according to Expression (16) which will be described later.

Then, as described above, the crank angle $\theta_0$ and the crank angle rotation speed dθ/dt and the like are applied as initial calculation values for the forward modal according to Expression (13). Then, the estimated values for both the corresponding crank angle θ and the crank angle rotation speed dθ/dt are calculated sequentially by sequentially updating the step number k. When 0 is substituted for the step number k in Expression (13), the expression can be written as shown in Expression (14a) below.

[Expression 14]

When $k=0$, $$\{\theta(2)-\theta(1)\}-\{\theta(1)-\theta(0)\}=\left[TRQ_e(\theta(0))-TRQ_{fr}(\theta(1)-\theta(0))-\frac{1}{2}h(\theta(0))\cdot(\theta(1)-\theta(0))^2\right]\Big/ f(\theta(0)) \tag{14a}$$

Here, (14b)

$\dot\theta(1)=\{\theta(2)-\theta(1)\}$, $\dot\theta(0)=\{\theta(1)-\theta(0)\}$ so, $$\dot\theta(1)-\dot\theta(0)=\left[TRQ_e(\theta(0))-TRQ_{fr}(\dot\theta(0))-\frac{1}{2}h(\theta(0))\cdot(\dot\theta(0))^2\right]\Big/ f(\theta(0))$$

-continued $$\Leftrightarrow\dot\theta(1)=\left[TRQ_e(\theta(0))-TRQ_{fr}(\dot\theta(0))-\frac{1}{2}h(\theta(0))\cdot(\dot\theta(0))^2\right]\Big/ f(\theta(0))+\dot\theta(0) \tag{14c}$$

$$\Leftrightarrow\dot\theta(1)=\left[TRQ_e(\theta(0))-TRQ_{fr}(\dot\theta(0))-\frac{1}{2}h(\theta(0))\cdot(\dot\theta(0))^2\right]\Big/ f(\theta(0))+\dot\theta_0$$

$$\theta(1)=\theta(0)+\dot\theta(0)=\theta(0)+\dot\theta_0 \tag{14d}$$

When a portion of the crank angle θ(k) in Expression (14a) is rewritten as the corresponding crank angle rotation speed dθ/dt, the expression can be written as shown in Expression (14b). When Expression (14b) is expanded, the crank angle rotation speed dθ(1)/dt when the step number k is 1 can be expressed using the last crank angle $\theta_0$ and the crank angle rotation speed $d\theta_0/dt$, i.e., those that were input as initial values, as shown in Expression (14c). Further, the crank angle θ(1) when the step number k is 1 can be calculated by integrating Expression (14c), as shown in Expression (14d).

When the foregoing process is repeated until the step number k reaches a predetermined number N, i.e., until the crank angle rotation speed becomes dθ(N)/dt=0, the crank angle rotation speed dθ(N)/dt=0 and the crank angle θ(N) is calculated. That is, according to the foregoing process, when the engine speed Ne at the time the internal combustion engine 10 is stopped is zero, the estimated values of the crankshaft stopping position can be calculated.

(Process Related to Step 104)

Next, it is determined whether the deviation between the estimated value of the crankshaft stopping position that was calculated by the process of step 102 and the actual measured value of the crankshaft stopping position that was detected by the crank angle sensor 40 is greater than a predetermined threshold value (step 104). If it is determined that the deviation is equal to or less than the predetermined threshold value, this cycle of the routine immediately ends.

(Process Related to Step 106)

If, on the other hand, it is determined in step 104 that the deviation in the crankshaft stopping position is greater than the threshold value, then learning the engine friction model 64 and the transmission friction model 65 is started (step 106). More specifically, the actual friction torque $TRQ_{f\_jitsu}$ is calculated according to Expression (15c) below by assigning the actual measured values of the crank angle θ and the crank angle rotation speed dθ/dt to the engine model 60.

[Expression 15]

$$J(\theta)=\frac{\partial f(\theta)}{\partial\theta}\dot\theta^2 \tag{15a}$$

$$f(\theta)\ddot\theta+\frac{1}{2}J(\theta)=TRQ_e+TRQ_{f\_jitsu}(\dot\theta)+TRQ_l(\dot\theta) \tag{15b}$$

$$\Rightarrow TRQ_{f\_jitsu}(\dot\theta)=f(\ddot\theta)\theta+\frac{1}{2}J(\theta)-TRQ_e-TRQ_l(\dot\theta) \tag{15c}$$

When describing the process by which Expression (15c) is obtained, the equation of motion around the crankshaft expressed in Expression (4e) above can be written as shown in Expression (15b) by setting J(θ) as in Expression (15a) described above. Then Expression (15c) can be obtained by rewriting the left side of Expression (15b) so that it becomes the actual friction torque $TRQ_{f\_jitsu}$.

Next, in step 106, a model friction torque $TRQ_{f\_model}$ is calculated according to Expression (16) below by the friction models (i.e., the engine friction model 64 and the transmission friction model 65). The symbol over $TRQ_{f\_model}$ and dθ/dt in Expression (16) indicates an estimated value, but is omitted in the description of this specification.

[Expression 16]

$$T\hat{R}Q_{f\_model} = \left(1 - R(\hat{\dot{\theta}})\right)T\hat{R}Q_{f\_map1}(\hat{\dot{\theta}}) + T\hat{R}Q_{f\_map2}(\hat{\dot{X}}) + R(\hat{\dot{\theta}})T\hat{R}Q_{fr\_m}(\hat{\dot{\theta}}) \tag{16}$$

where R(dθ/dt) is the friction distribution ratio for distributing the model friction torque $TRQ_{f\_model}$ to the engine side and the transmission side.

The actual friction torque $TRQ_{f\_jitsu}$ and the model friction torque $TRQ_{f\_model}$ described above are each calculated for each predetermined engine speed region every 100 rpm, for example, and stored in the ECU 50. Also, these friction torques are calculated at a plurality of points for each speed region and the average value is also stored for each speed region.

In step 106, an actual friction difference $\Delta TRQ_{f\_jitsu}$ which is the difference between the current calculated value and the last calculated value of the actual friction torque $TRQ_{f\_jitsu}$ is calculated according to Expression (17a). Similarly, a model friction difference $\Delta TRQ_{f\_model}$ which is the difference between the current calculated value and the last calculated value of the model friction torque $TRQ_{f\_model}$ is calculated according to Expression (17b).

[Expression 17]

$$\Delta TRQ_{f\_jitsu} = TRQ_{f\_jitsu}(\text{current}) - TRQ_{f\_jitsu}(\text{last}) \tag{17a}$$

$$\Delta TRQ_{f\_mdl} = TRQ_{f\_mdl}(\text{current}) - TRQ_{f\_mdl}(\text{last}) \tag{17b}$$

The last calculated values in Expressions (17a) and (17b) refer to the calculated values that were calculated most recently in a predetermined calculation cycle during the current routine.

A second engine friction torque $TRQ_{f\_map2}$ related to translational movement of the piston 12 is a constant value that does not rely on the piston speed (dXi/dt) with the exception of the state moments before the internal combustion engine 10 stops, as described before. Accordingly, as described above, the friction torque of the rotational sliding component around the crankshaft 16 (i.e., rotational friction (including that of the transmission at this point)) can be derived by isolating the translational movement component (translational friction) $TRQ_{f\_map2}$ from the actual or model friction torque $TRQ_f$.

Figure 8:
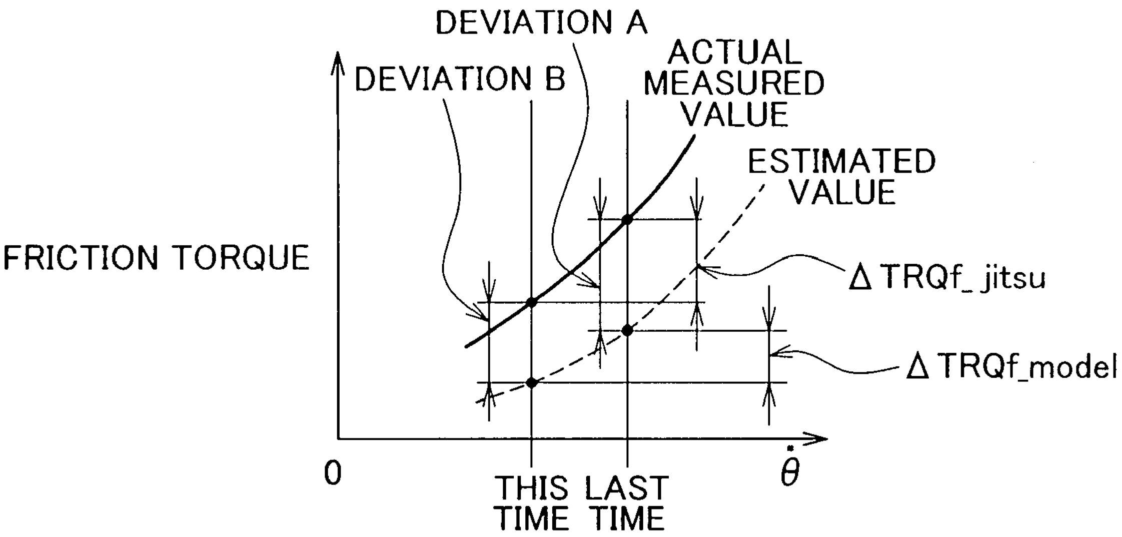
FIG. 8 is a graph illustrating a method for calculating friction difference $\Delta TRQ_{f}$.

FIG. 8 is a graph illustrating a method for calculating that friction difference $\Delta TRQ_f$. In FIG. 8 the solid line shows the actual friction torque $TRQ_{f\_jitsu}$ and the broken line shows the model friction torque $TRQ_{f\_model}$. The actual friction difference $\Delta TRQ_{f\_jitsu}$ and the model friction difference $\Delta TRQ_{f\_model}$ calculated by Expressions (17a) and (17b) correspond to change amounts in the friction torque during a predetermined calculation cycle interval, as shown in FIG. 8. That is, these differences $\Delta TRQ_f$ are values corresponding to the slopes of the change in the rotational friction from which the translational friction has been removed.

(Process Related to Step 108)

In the routine shown in FIG. 7, the friction deviation (i.e., the rotational friction deviation and the translational friction deviation) is then calculated for each piston speed (dXi/dt) and each crank angle rotation speed (dθ/dt). Then friction learning of the rotational friction deviation or friction learning of the translational friction deviation is performed using the friction distribution ratio R(dθ/dt) (step 108).

More specifically, the difference between the actual friction difference $\Delta TRQ_{f\_jitsu}$ and the model friction difference $\Delta TRQ_{f\_model}$ is calculated as a rotational friction deviation $\Delta TRQ_{f\_mdl}$. This rotational friction deviation is a value that corresponds to the deviation in the slopes of the rotational friction between the actual friction and the model friction.

Next, the average value between i) a deviation A (see FIG. 8) between the actual friction torque $TRQ_{f\_jitsu}$ calculated last time and the model friction torque $TRQ_{f\_model}$ calculated last time, and ii) a deviation B (see FIG. 8) between the actual friction torque $TRQ_{f\_jitsu}$ calculated this time and the model friction torque $TRQ_{f\_model}$ calculated this time, is calculated as the rotational friction deviation. Regardless of whether there is no rotational friction deviation $\Delta TRQ_{f\_mdl}$, i.e., regardless of whether the slopes of the waveforms between the solid line and the broken line shown in FIG. 8 match up, when both deviations A and B exist, it can be determined that those kinds of deviations are translational movement component deviations. Therefore, when there is no rotational friction deviation $\Delta TRQ_{f\_mdl}$, the translational friction, i.e., the second engine friction torque $TRQ_{f\_map2}$ (see FIG. 4B), is to be learned. Incidentally, the reason for using the average values of the deviation A and the deviation B is to prevent erroneous learning of the model.

Next in step 108, the rotational friction deviation $\Delta TRQ_{f\_mdl}$ is divided into the engine side rotational friction deviation $\Delta TRQ_{f\_map1}$ and the transmission side rotational friction deviation $\Delta TRQ_{f\_m}$ according to Expressions (18a) and (18b). According to this method, the rotational friction deviation $\Delta TRQ_{f\_mdl}$ can be distributed between the engine friction model 64 and the transmission friction model 65 based on the degree of contribution to the deviation of the crankshaft stopping position due to friction.

[Expression 18]

$$\Delta T\hat{R}Q_{f\_md1} = \left(1 - R(\hat{\dot{\theta}})\right)\Delta T\hat{R}Q_{f\_map1}(\hat{\dot{\theta}}) + R(\hat{\dot{\theta}})\Delta T\hat{R}Q_{f\_m}(\hat{\dot{\theta}}) \tag{18a}$$

$$\Delta T\hat{R}Q_{f\_md1} = R(\hat{\dot{\theta}})\Delta T\hat{R}Q_{f\_map1}(\hat{\dot{\theta}}) + \left(1 - R(\hat{\dot{\theta}})\right)\Delta T\hat{R}Q_{f\_m}(\hat{\dot{\theta}}) \tag{18b}$$

Figure 9:
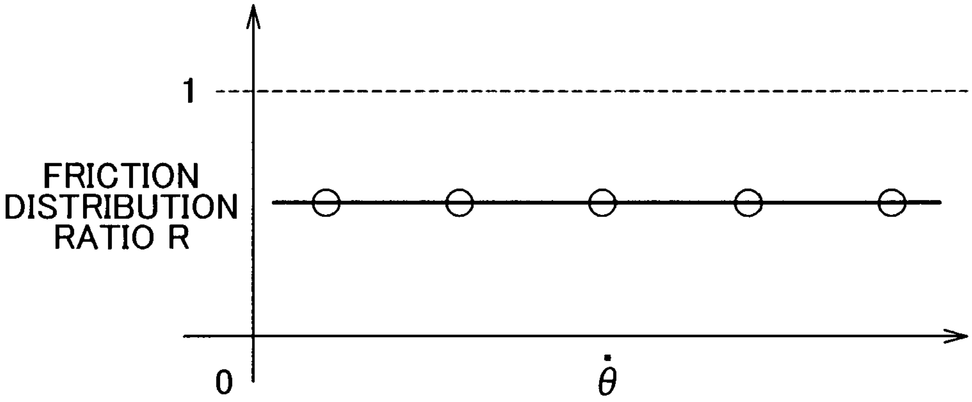
FIG. 9 is an example of a map for obtaining a friction distribution ratio $R(d\theta/dt)$.

The friction distribution ratio R(dθ/dt) used in Expressions (18a) and (18b) can be obtained from the map shown in FIG. 9. That is, in FIG. 9 the value of the friction distribution ratio R(dθ/dt) is set for each predetermined crank angle rotation speed (dθ/dt) such as 100 rpm, for example, corresponding to the engine friction map and transmission friction map shown in FIGS. 4A, 4B, and 5. FIG. 9 shows an example of a case in which the distribution ratio R(dθ/dt) is fixed regardless of the crank rotation speed (dθ/dt), but is a value corresponding to the crank rotation speed (dθ/dt).

The engine side rotational friction torque deviation $\Delta TRQ_{f\_map1}$ and the transmission side rotational friction deviation $\Delta TRQ_{f\_m}$ distributed as described above are matched up with the map values of the engine friction map and the transmission friction map, respectively, of the corresponding crank rotation speed (dθ/dt), i.e., friction learning is executed. The engine side rotational friction torque deviation $\Delta TRQ_{f\_map1}$ and the transmission side rotational friction deviation $\Delta TRQ_{f\_m}$ become the deviation of the slope in the map in the corresponding crank rotation speed region in the engine friction map and the transmission friction map so the slope of the map in the corresponding crank rotation speed region can be corrected by this kind of process.

(Process Related to Step 110)

Next in the routine shown in FIG. 7, an estimated value recalculation flag is set to ON (step 110). This estimated value recalculation flag is a flag which indicates that learning of the engine friction model 64 and the transmission friction model 65 was performed when the clutch was engaged. When the estimated value recalculation flag is on, it can be determined that the actual friction torque $TRQ_{f\_jitsu}$ and the model friction torque $TRQ_{f\_model}$ match up when the current friction distribution ratio R(dθ/dt) is used.

(Process Related to Step 112)

After the estimated value recalculation flag is turned on, the friction maps (i.e., both the engine friction map and the transmission friction map) are then updated based on the learning results from step 108 (step 112).

2. Process when Clutch is Disengaged (Process Related to Step 114)

Also in the routine shown in FIG. 7, when it was determined in step 100 that the clutch was disengaged, the estimated value of the crankshaft stopping position is calculated by the engine model 60 (step 114). The process in step 114 is the same as the process in step 102 except for that i) the calculation is performed only using the engine friction model 64 as the friction model, and ii) the inertia moment $I_{mi}$ relating to the transmission is set to zero in Expression (3) which is the formula for calculating the total kinetic energy T around the crankshaft. Therefore, a detailed description of this will be omitted here.

(Process Related to Step 116)

Next, it is determined whether the deviation between the estimated value of the crankshaft stopping position calculated by the process in step 114 and the actual measured value of the crankshaft stopping position detected by the crankshaft angle sensor 40 is greater than a predetermined threshold value (step 116). If that deviation is equal to or less than the predetermined threshold value, this cycle of the process quickly ends.

(Process Related to Step 118)

If, on the other hand, it is determined in step 116 that the deviation in the crankshaft stopping position is greater than the threshold value, then it is determined whether the estimated value recalculation flag is off (step 118).

(Process Related to Step 120)

If it is determined in step 118 that the estimated value recalculation flag is not off, i.e., if it is determined that the deviation in the crankshaft stopping position is greater than the threshold value regardless of whether the calculation was performed at a timing after learning of the engine friction model 64 and the transmission friction model 65 was performed, it can be determined that the friction distribution ratio R(dθ/dt) was not an appropriate value. Therefore in this case, the friction distribution ratio R(dθ/dt) is corrected (step 120). More specifically, learning of the friction distribution map shown in FIG. 9 is executed.

In step 120, the actual friction torque $TRQ_{f\_jitsu}$ when the clutch is disengaged is first calculated according to Expression (15c) by assigning the actual measured values of the crank angle θ and the crank angle rotation speed dθ/dt to the engine model 60. At this time, the average value of the calculated values at a plurality of points is also calculated for each engine speed region. The calculation of the actual friction torque $TRQ_{f\_jitsu}$ is performed in the same manner as it is in step 106 except for that the inertia moment relating to the transmission (i.e., the transmission side inertia) is set to zero.

Next, the friction ratio is calculated for each engine speed region as the ratio of the average value of the actual friction torque $TRQ_{f\_jitsu}$ when the clutch is disengaged to the average value of the latest actual friction torque $TRQ_{f\_jitsu}$ when the clutch is engaged that was calculated in step 106. Next, the friction distribution ratio map is updated based on this friction ratio, after which the estimated value recalculation flag is turned off (step 122).

(Processes Related to Steps 124 and 126)

If, on the other hand, it was determined in step 118 that the estimated value recalculation flag is off, then it can be determined that the estimated value of the friction of the engine friction model 64 was not appropriate. Therefore in this case, learning of the engine friction model 64 is started (step 124).

Next, the friction deviations (i.e., the rotational friction deviation and the translational friction deviation) are calculated for each piston speed (dXi/dt) and crank angle rotation speed (dθ/dt). Then learning of the rotational friction deviation or the translational friction deviation is executed (step 126). The processes in steps 124 and 126 are the same as the processes in steps 106 and 108 described above, with the exception that the calculation is performed using only the engine friction model 64 as the friction model and the inertia moment $I_{mi}$ related to the transmission is set to zero. Therefore, a detailed description will be omitted here. After the process of step 126 is performed, the friction map (i.e., the engine friction map) is updated based on the learning results from step 126 (step 112).

According to the routine shown in FIG. 7 described above, erroneous learning can be prevented while the effects from the rates at which oil degrades in the internal combustion engine 10 and the transmission and the like can be precisely learned based on the engine friction model 64 and the transmission friction model 65 which take into account the changes in the inertia related to the transmission and the friction when the clutch is engaged or disengaged.

Also, in the engine model 60, the estimated value of the crankshaft stopping position is corrected based on the friction learning results according to the routine shown in FIG. 7. Therefore, according to the system of this example embodiment, stopping position control that takes into account the effect from the friction due to the difference in the engagement state of the clutch during eco-run control is possible so that estimation accuracy and the reliability of the control can be improved.

In the first example embodiment described above, the clutch sensor 56 corresponds to “clutch engagement state detecting means” in the first aspect. Also, the “deviation contributing degree obtaining means” and the “deviation distributing means” in the second aspect are each realized by the ECU 50 executing the process in step 108. Further, the “friction correcting means” in the third aspect is realized by the ECU 50 executing the process in step 112. Also, the “correcting information obtaining means” in the fourth aspect is realized by the ECU 50 executing the process of step 110, and the “contributing degree correcting means” in the fourth aspect is realized by the ECU 50 executing the processes of steps 118 and 120.

Modified Example Embodiment

Next, a modified example embodiment will be described with reference to FIG. 10. The system of this modified example embodiment is realized by having the ECU 50 execute the routine in FIG. 10 instead of the routine in FIG. 7 using the hardware structure shown in FIG. 1 and the engine model 60 shown in FIG. 2.

[Friction Learning According to the Modified Example Embodiment]

The internal combustion engine 10, the engine oil, the transmission, and the transmission fluid do not always degrade in sync so there may be some variation in the degree of degradation in the internal combustion engine 10 and the transmission. Such variation may affect the learning accuracy and learning speed of the engine friction and the transmission friction which are necessary to precisely estimate the crankshaft stopping position.

Therefore, in this example embodiment, regardless of whether the clutch is engaged or disengaged, learning of the transmission friction is separate from the combined learning of the engine friction and the transmission friction such that the learning of the transmission friction and the updating of its learning value are performed separately.

Figure 10:
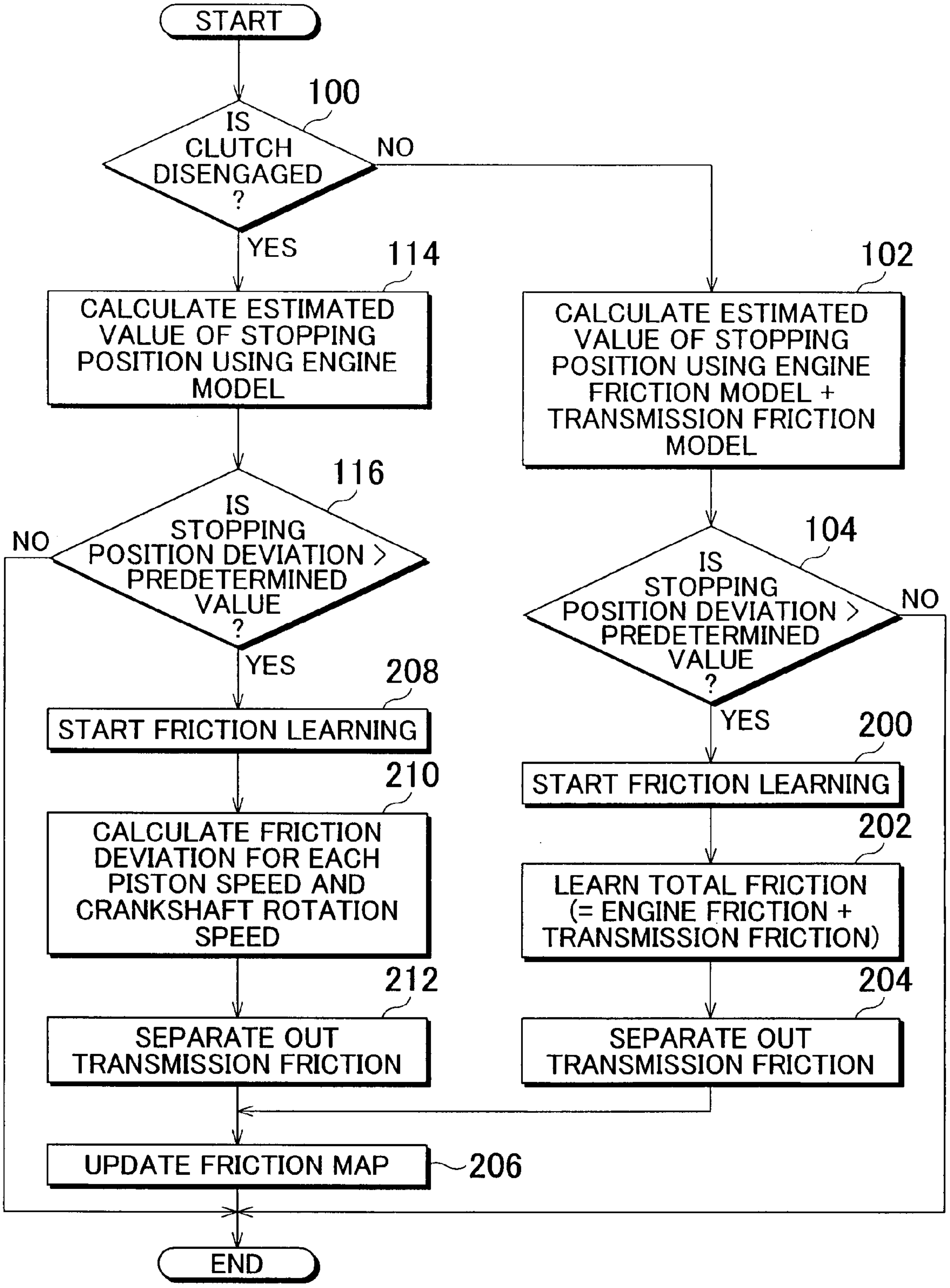
FIG. 10 is a flowchart of a routine executed in a modified example embodiment of the invention.

FIG. 10 is a flowchart of a routine executed by the ECU 50 in the modified example embodiment in order to realize the foregoing function. Steps in FIG. 10 in this example embodiment that are the same as steps in FIG. 7 in the first example embodiment will be denoted by the same reference numerals and descriptions thereof will be omitted or simplified.

1. Process when Clutch is Engaged

Similar to the routine shown in FIG. 7, in the routine in FIG. 10, when it was determined in step 100 that the clutch is engaged, the estimated value of the crankshaft stopping position is calculated by the engine model 60 using both the engine friction model 64 and the transmission friction model 65 as friction models (step 102).

(Processes Related to Steps 200 and 202)

As a result, when it has been determined in step 104 that the deviation between the estimated value of the crankshaft stopping position and the actual measured value is greater than the predetermined threshold value, learning of the engine friction model 64 and the transmission friction model 65 is started (step 200). More specifically, in the next step 202, learning of the total friction of the internal combustion engine and the transmission, i.e., learning of the engine friction model 64 and the transmission friction model 65, is performed.

In step 202, the total actual friction torque $TRQ_{f\_jitsu}$ is first calculated according to Expression (15c) above by assigning the actual measured values of the crank angle θ and the crank angle rotation speed dθ/dt to the engine model 60. Then the total model friction torque $TRQ_{f\_model}$ is calculated using the engine friction model 64 and the transmission friction model 65, or more specifically, using the friction maps (see FIGS. 4A, 4B, and 5) provided in those friction models. These friction torques are then calculated for each of predetermined engine speed regions and stored in the ECU 50.

Next in step 202 the total friction deviation $\Delta TRQ_{f\_total}$ of the actual friction torque $TRQ_{f\_jitsu}$ and the model friction torque $TRQ_{f\_model}$ is calculated according to Expression (19) below.

[Expression 19]

$$\Delta TRQ_{f\_total} = TRQ_{f\_jitsu} - TRQ_{f\_model} \tag{19}$$

(Process Related to Step 204)

Next, a process is executed for isolating the transmission friction deviation $\Delta TRQ_{f\_mt}$, which corresponds to the friction deviation on the transmission side, from the total friction deviation $\Delta TRQ_{f\_total}$ that was calculated in step 202 (step 204). More specifically, the transmission deviation $\Delta TRQ_{f\_mt}$ is calculated according to Expression (20) below.

[Expression 20]

$$\Delta TRQ_{f\_mt} = \Delta TRQ_{f\_total} - \Delta TRQ_{f\_engine} \tag{20}$$

When the transmission friction deviation $\Delta TRQ_{f\_mt}$ is calculated according to Expression (20), the latest value calculated in step 126 is used for the engine friction deviation $\Delta TRQ_{f\_engine}$.

(Process Related to Step 206)

Next, the friction map is updated based on the learning results from steps 202 and 204 (step 206). More specifically, the friction map for both the engine and the transmission are updated by reflecting the learning results from step 202. In addition, the friction map for the transmission is updated separately by reflecting the learning results from step 204.

2. Process when Clutch is Disengaged

Also, similar to the routine shown in FIG. 7, in the routine shown in FIG. 10, when it has been determined in step 100 that the clutch is disengaged, the estimated value of the crankshaft stopping position is calculated by the engine model 60 using only the engine friction model 64 as the friction model (step 114).

(Processes Related to Steps 208 and 210)

As a result, when it has been determined that the deviation between the estimated value of the crankshaft stopping position and the actual measured value of the crankshaft stopping position is greater than the predetermined threshold value (step 116), learning of the engine friction model 64 is then started (step 208). More specifically, in the next step, i.e., step 210, the engine friction deviation $\Delta TRQ_{f\_engine}$ is calculated for each piston speed (dXi/dt) and crank angle rotation speed (dθ/dt). This calculation of the engine friction deviation $\Delta TRQ_{f\_engine}$ is the same as it is in the process of step 202 described above, except for that the calculation is performed using only the engine friction model 64 as the friction model and the inertia moment $I_{mt}$ related to the transmission is set to zero. Therefore, a detailed description will be omitted here.

(Process Related to Step 212)

Next, a process is performed to obtain the transmission friction deviation $\Delta TRQ_{f\_mt}$ corresponding to the friction deviation on the transmission side, according to Expression (20) above using the friction deviation $\Delta TRQ_{f\_engine}$ on the engine side that was calculated in step 210 (step 212). When the transmission friction deviation $\Delta TRQ_{f\_mt}$ is calculated according to Expression (20) above, the latest value calculated in step 202 is used for the total friction deviation $\Delta TRQ_{f\_total}$.

Next, the friction map is updated based on the learning results from steps 208 and 210 (step 206). More specifically, the engine friction map is updated by reflecting the learning results from step 210, while the transmission friction map is updated separately by reflecting the learning results from step 212.

According to the routine shown in FIG. 10 described above, regardless of whether the clutch is engaged or disengaged, the learning of the transmission friction is separate from the combined learning of the engine friction and the transmission friction such that the learning of only the transmission friction and the updating of that learning value are performed separately. Therefore, when updating the engine friction and updating the transmission friction, even if these updates are not completed at the same time, the friction models are updated individually so it is possible to ensure sufficient learning accuracy and learning speeds of the friction models.

Also, as described below, exceptional results with respect to the first example embodiment described above can be achieved. In the method according to the first example embodiment, a process is performed in which either the friction distribution ratio R(dθ/dt) is corrected (step 120) or the engine friction model 64 is corrected (step 126 and 112) after the crankshaft stopping position was estimated when the clutch was engaged. However, when the transmission friction is not convergent, it is unknown whether the deviation in the stopping position estimation is due to the friction distribution ratio R(dθ/dt) or the engine friction so it is difficult to immediately make a correction.

The reason for this problem is as follows. When the transmission friction is not convergent, the foregoing problem may be caused by the degradation states on the engine side and the transmission side not always being synchronous. If the map of the friction distribution ratio R(dθ/dt) is used while such variation exists, then in a situation in which the learning of this map is not successfully completed, i.e., in a situation in which friction deviation on the engine side and the transmission side can not be appropriately distributed, friction learning is continued while the friction deviation on the transmission side is not correctly known. Therefore, learning of the engine friction will not end if learning of the friction distribution ratio R(dθ/dt) is not completed.

In contrast, according to the method of this example embodiment, learning of only the transmission friction and updating of that learning value are performed separately from the learning and updating of the engine friction torque regardless of whether the clutch is engaged or disengaged. Therefore, fast and highly accurate friction learning can be performed irrespective of the degree of degradation on the engine side and transmission side. Also according to the method of this example embodiment, by replacing only one of either the engine oil or the transmission fluid, even if something causes a large change in the friction in only the one that was replaced, it is not necessary to perform learning of the friction distribution ratio R(dθ/dt) and the friction maps for both the engine and the transmission as it was in the method according to the first example embodiment described above. This is also advantageous in terms of learning speed. Also, the map of the friction distribution ratio R(dθ/dt) does not need to be provided as a learning value in addition to the friction maps for the engine and transmission so the amount of RAM in the ECU 50 used can also be reduced.

In the modified example embodiment described above, the "transmission friction obtaining means" in the fifth aspect is realized by the ECU 50 executing the process in step 204 or 212. Also, the "first friction learning means" in the fifth aspect is realized by the ECU 50 executing the processes in either steps 202 and 206 or steps 210 and 206. Moreover, the "second friction learning means" in the firth aspect is realized by the ECU 50 executing the processes in either steps 204 and 206 or steps 212 and 206.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A stopping position control apparatus of an internal combustion engine, comprising:

a transmission;

an engine friction model that calculates friction in the internal combustion engine;

a transmission friction model that calculates friction in a transmission used in combination with the internal combustion engine;

a clutch engagement state detecting device that detects whether a clutch arranged between the internal combustion engine and the transmission is engaged; and a crankshaft stopping position calculating device that calculates a position where a crankshaft of the internal combustion engine is stopped, wherein when the clutch is engaged, a crankshaft stopping position is calculated based on the friction calculated by both the engine friction model and the transmission friction model.

2. The stopping position control apparatus of an internal combustion engine according to claim 1, further comprising:

a deviation contributing degree obtaining apparatus that obtains, based on crank angle information of the internal combustion engine, each degree of contribution that the engine friction model and the transmission friction model each contribute to deviation in the crankshaft stopping position due to friction; and a deviation distributing apparatus that distributes, based on the degree of contribution, the deviation in the crank stopping position to the engine friction model.

3. The stopping position control apparatus of an internal combustion engine according to claim 2, further comprising:

a friction correcting apparatus that corrects the engine friction model and/or the transmission friction model based on the distributed deviation in the crankshaft stopping position.

4. The stopping position control apparatus of an internal combustion engine according to claim 1, further comprising:

a correcting information obtaining apparatus that obtains information as to whether the engine friction model and/or the transmission friction model has been corrected while the clutch is engaged, wherein the deviation contributing degree obtaining apparatus includes a contributing degree correcting device that corrects the degree of contribution if the deviation in the crankshaft stopping position is determined to be larger than a predetermined value when the crankshaft stopping position is calculated while the clutch is disengaged after the engine friction model and/or the transmission friction model has been corrected while the clutch is engaged.

5. The stopping position control apparatus of an internal combustion engine according to claim 1, further comprising:

a transmission friction obtaining apparatus that obtains transmission friction corresponding to the friction in the transmission by separating the transmission friction corresponding to the friction in the transmission from the total friction that is calculated by both the engine friction model and the transmission friction model;

a first friction learning apparatus which performs learning of the engine friction model and the transmission friction model in combination or performs only learning of the engine friction model; and a second friction learning apparatus that performs learning, independently of the first friction learning apparatus, of the transmission friction model based on the transmission friction.

6. A stopping position control method of an internal combustion engine, comprising the steps of:

calculating friction in the internal combustion engine based on an engine friction model;

calculating friction in a transmission used in combination with the internal combustion engine based on a transmission friction model;

detecting whether a clutch that is arranged between the internal combustion engine and the transmission is engaged; and calculating a crankshaft stopping position based on the friction calculated by the engine friction model and the transmission friction model, when the clutch is engaged.

7. The stopping position control method of an internal combustion engine according to claim 6, further comprising the steps of:

obtaining, based on crank angle information of the internal combustion engine, each degree of contribution that the engine friction model and the transmission friction model each contribute to deviation in the crankshaft stopping position due to friction; and distributing the deviation in the crank stopping position between the engine friction model and the transmission friction model based on the degree of contribution.

8. The stopping position control method of an internal combustion engine according to claim 7, further comprising the step of:

correcting the engine friction model and/or the transmission friction model based on the distributed deviation in the crankshaft stopping position.

9. The stopping position control method of an internal combustion engine according to claim 6, further comprising the steps of:

obtaining information as to whether the engine friction model and/or the transmission friction model has been corrected while the clutch is engaged; and correcting the degree of contribution if the deviation in the crankshaft stopping position is determined to be larger than a predetermined value when the crankshaft stopping position is calculated while the clutch is disengaged after the engine friction model and/or the transmission friction model has been corrected while the clutch is engaged.

10. The stopping position control method of an internal combustion engine according to claim 6, further comprising the steps of:

obtaining transmission friction corresponding to the friction in the transmission by separating the transmission friction corresponding to the friction in the transmission from the total friction that is calculated by both the engine friction model and the transmission friction model;

performing learning of the engine friction model and the transmission friction model in combination or performs only learning of the engine friction model; and performing learning, independently of the first friction learning, of the transmission friction model based on the transmission friction.

11. A stopping position control apparatus of an internal combustion engine, comprising:

a transmission;

an engine friction model that calculates friction in the internal combustion engine;

a transmission friction model that calculates friction in the transmission used in combination with the internal combustion engine;

a crankshaft stopping position calculating means for calculating a position where a crankshaft of the internal combustion engine is stopped, a clutch engagement state detecting device that detects whether a clutch arranged between the internal combustion engine and the transmission is engaged, wherein when the clutch is engaged, a crankshaft stopping position is calculated based on the friction calculated by both the engine friction model and the transmission friction model.

* * * * *